(12) United States Patent
Wang et al.

(10) Patent No.: US 11,513,312 B2
(45) Date of Patent: Nov. 29, 2022

(54) LENS DRIVE DEVICE

(71) Applicant: Shanghai Billu Electronics Co., Ltd., Shanghai (CN)

(72) Inventors: Jianhua Wang, Shanghai (CN); Gaofeng Gong, Shanghai (CN); Xiaoliang Zhang, Shanghai (CN)

(73) Assignee: Shanghai Billu Electronics Co., Ltd., Shanghai (CN)

( * ) Notice: Subject to any disclaimer, the term of this patent is extended or adjusted under 35 U.S.C. 154(b) by 188 days.

(21) Appl. No.: 16/092,218

(22) PCT Filed: Sep. 11, 2017

(86) PCT No.: PCT/CN2017/101313
§ 371 (c)(1),
(2) Date: Oct. 9, 2018

(87) PCT Pub. No.: WO2018/046010
PCT Pub. Date: Mar. 15, 2018

(65) Prior Publication Data
US 2020/0341232 A1    Oct. 29, 2020

(30) Foreign Application Priority Data
Sep. 12, 2016   (CN) .......................... 201610816847.6

(51) Int. Cl.
*G02B 7/09* (2021.01)
*G02B 7/08* (2021.01)
(Continued)

(52) U.S. Cl.
CPC ................. *G02B 7/09* (2013.01); *G02B 7/08* (2013.01); *G02B 13/001* (2013.01); *G03B 13/36* (2013.01);
(Continued)

(58) Field of Classification Search
CPC ............. H02K 41/035; H02K 41/0354; H02K 41/0356; G02B 13/36; G02B 13/001; G02B 7/08; G02B 7/09
See application file for complete search history.

(56) References Cited

U.S. PATENT DOCUMENTS

| 2015/0015729 | A1 | 1/2015 | Kasamatsu |
| 2015/0160471 | A1* | 6/2015 | Dong ....................... G02B 7/08 359/557 |

(Continued)

FOREIGN PATENT DOCUMENTS

| CN | 203673131 U | 6/2014 |
| CN | 104423012 A | 3/2015 |

(Continued)

OTHER PUBLICATIONS

Supplemental EP Search Report dated Mar. 29, 2019 re: Application No. 17848183.4, pp. 1-7, citing: US 20150015729 A1 and WO 2016003103 A1.
International Search Report for PCT application No. PCT/CN2017/101313 filed on Sep. 11, 2017, dated Nov. 29, 2017.

*Primary Examiner* — Alicia M Harrington
(74) *Attorney, Agent, or Firm* — Gang Yu

(57) ABSTRACT

A lens drive device, including a lens support, a coil winded at a periphery of the lens support; a screening can is covered outside the lens support; a driving magnets is respectively provided on opposite two inner sidewalls of the screening can; a Printed Circuit Board board (PCB board) is provided on a sidewall at another side of the screening can; a Hall chip is provided on the PCB board; a Hall magnet back gasket and a Hall magnet are provided at corresponding positions of the lens support; and the PCB board and the Hall chip thereon and the Hall magnet form a lens position detection unit. Since the driving magnets and the Hall magnet are not hindered to each other in a configuration structure, no (Continued)

obstacle is produced to assembly work, and the further miniaturization and thinning of the lens drive device also become possible.

2 Claims, 7 Drawing Sheets

(51) Int. Cl.
*G02B 13/00* (2006.01)
*H02K 41/035* (2006.01)
*H04N 5/225* (2006.01)
*G03B 13/36* (2021.01)

(52) U.S. Cl.
CPC ......... *H02K 41/035* (2013.01); *H04N 5/2254* (2013.01)

(56) References Cited

U.S. PATENT DOCUMENTS

2016/0109680 A1* 4/2016 Park .................. H04N 5/2252
359/824
2017/0285363 A1* 10/2017 Hu ........................ G02B 7/09

FOREIGN PATENT DOCUMENTS

| CN | 105301733 A | 2/2016 |
| CN | 105807538 A | 7/2016 |
| CN | 106443949 A | 2/2017 |
| CN | 106646810 * | 5/2017 |
| CN | 206362989 U | 7/2017 |
| WO | 2015133731 A1 | 9/2015 |
| WO | 2016003103 A1 | 1/2016 |

* cited by examiner

LENS DRIVE DEVICE

TECHNICAL FIELD

The present disclosure relates to a close-loop lens drive device, and more particularly, to a lens drive device for driving a camera lens of an automatic focusing camera carried in a mobile phone and the like.

BACKGROUND

A lens drive device of an automatic focusing camera carried in a portable terminal device such as a mobile phone generally comprises a lens support for supporting a lens on an inner circumference, a coil configured on an outer circumference of the lens support, a spring for elastically supporting the lens support, and multiple magnets arranged at the inner four sides of a ring port, configured according to a certain interval and proportion and configured opposite to the coil. By powering on the coil, the magnets and the coil are interacted to generate an electromagnetic force, so that the lens support is driven to move to an optical axis direction and is stayed at a position balanced with an elastic force of the spring. By controlling a coil current, the lens support is driven to move to a specified target position, thereby achieving the focusing purpose.

However, such a focusing process is relatively time-consuming. When the lens is moved to a position, it is not stopped immediately and will be shaken at an expected position due to factors such as inertia, so there needs a stabilization time to maintain it. And moreover, an actual position stayed is not necessarily coincided with an evaluation specified position.

SUMMARY

In order to solve problems in a related technology, some embodiments of the present disclosure provide a lens drive device. The lens drive device has advantages of low energy consumption, capability of quickly and accurately moving and fast focusing speed.

To this end, the technical solutions adopted by the some embodiments are as follows: a lens drive device includes a lens support, a coil winded at a periphery of the lens support, an upper cover arranged above the lens support, and a lower cover arranged below the lens support; a screening can is covered outside the lens support; the lens drive device is characterized in that a driving magnets are respectively provided on opposite two inner sidewalls of the screening can; a Printed Circuit Board board (PCB board) is provided on a sidewall at another side of the screening can; a Hall chip is provided on the PCB board; a Hall magnet back gasket and a Hall magnet are provided at corresponding positions of the lens support; spatially, the Hall magnet and the Hall chip are spaced to each other and are configured oppositely; and the PCB board, the Hall chip on the PCB board and the Hall magnet form a lens position detection unit.

According to a preferred embodiment of the present disclosure, two elongated driving magnets are respectively provided on two different inner circumferential sidewalls of the screening can; and the two elongated driving magnets are opposite to each other.

According to a preferred embodiment of the present disclosure, an opened notch portion is provided at an upper corner of an outer circumference of the lens support; and the opened notch portion is accommodated into the Hall magnet back gasket and the Hall magnet sequentially from inside to outside.

According to a preferred embodiment of the present disclosure, an upper gasket is arranged above the upper cover; an upper spring is clamped between the upper gasket and the upper cover; and a lower spring is provided between the lens support and the lower cover, and is configured to support the lens support.

According to a preferred embodiment of the present disclosure, four-pole magnetization is adopted by the Hall magnet; and a non-magnetic area of the Hall magnet is not greater than 0.2 mm, so that the induction intensity of a magnetic field is intensified.

According to a preferred embodiment of the present disclosure, in the lens drive device, the Hall magnet back gasket is made of a stainless steel high-magnetism material, so that the magnetic flux intensity of the Hall magnet can be effectively protected and improved.

Some embodiments of the present disclosure achieve the following technical effects.

1. The lens drive device of some embodiments of the present disclosure has focusing accuracy and has the characteristics of faster focusing and lower power consumption, etc.; the imaging effect is relatively good in cooperation with the lens; and even under a condition of insufficient light, the imaging effect is more excellent.

2. In closed-loop control of some embodiments of the present disclosure, since a control subject can find and correct an operation deviation of a controlled object according to feedback information, so relatively strong anti-interference capacity is achieved, the effective control can be performed, and thus the realization of a predetermined goal is guaranteed.

3. Through the closed-loop lens drive device of some embodiments of the present disclosure, the establishment time can be shortened relatively, and the problems of a delay phenomenon and a poor solving posture during motor operation are reduced.

4. In some embodiments of the present disclosure, the two elongated driving magnets are respectively provided on two opposite sides in the screening can, and the Hall magnet is provided at the opened notch portion of the lens support. A mutual space interval between the driving magnets and the Hall magnet is relatively large and respective assembly prevention is compact, so a magnetic field mutual interference condition such as a mutual attractive or repulsive force and the like possibly generated between the driving magnets and the Hall magnet is avoided in a structure. Since the driving magnets are prevented from generating negative effect and impact on the Hall magnet and the Hall chip in a spatial structure, no obstacle is generated for stable signal output and action of a sensor. In other words, no impact is caused to calculate a correct position of a lens.

5. According to the closed-loop structure of some embodiments of the present disclosure, since the driving magnets and the Hall magnet are not hindered to each other in a configuration structure, no obstacle is produced to assembly work, and the further miniaturization and thinning of the lens drive, device also become possible.

Figure 1:
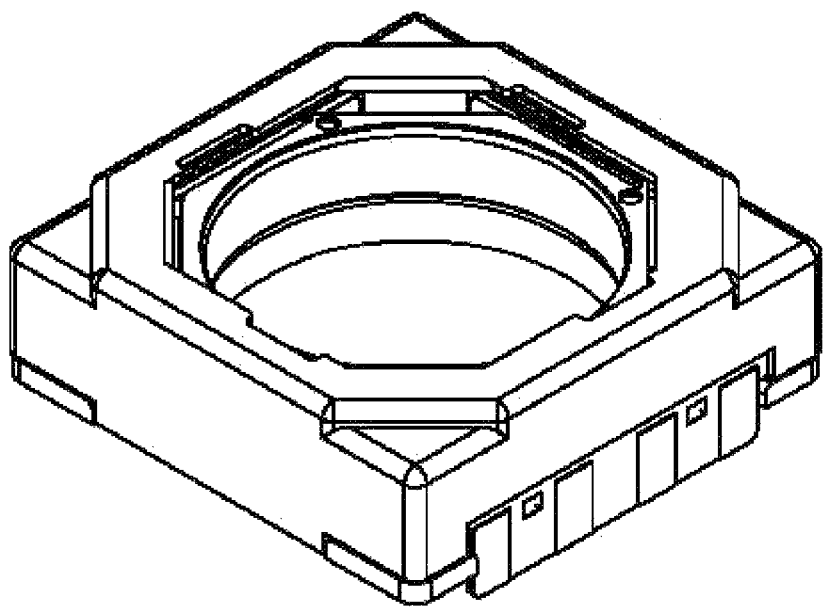
FIG. 1 is a complete stereoscopic schematic diagram of a closed-loop lens drive device of an embodiment of the present disclosure.
Figure 2:
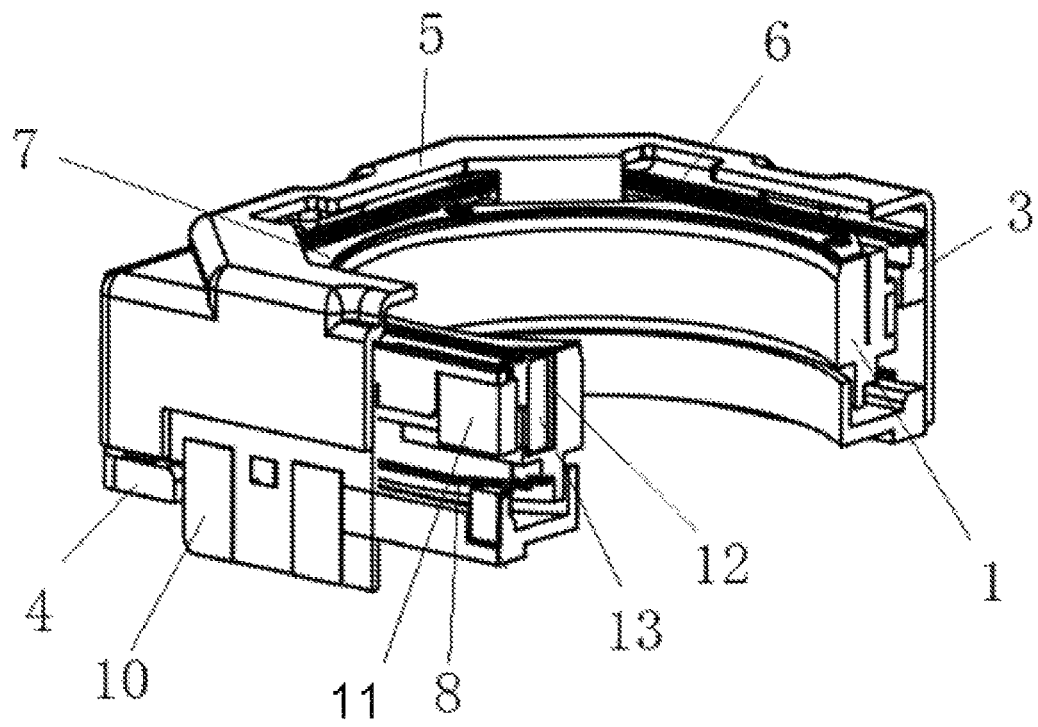
FIG. 2 is a cross-sectional diagram of an inner component assembly structure of a closed-loop lens drive device.

In the drawings: a lens support 1, a coil 2, an upper cover 3, a lower cover 4, a screening can 5, an upper gasket 6, an upper spring 7, a lower spring 8, a driving magnets 9, a PCB board 10, a Hall chip 11, a Hall magnet back gasket 12, a Hall magnet 13, a capacitor 14, a terminal pin 15, a gap portion 16, an opened notch portion 17, a turnup 18, and a non-magnetic area 19.

DETAILED DESCRIPTION OF THE EMBODIMENTS

The technical solutions of the present disclosure will be clearly and completely described as follows with reference to the accompanying drawings. Apparently, the embodiments as described below are merely part of, rather than all, embodiments of the present disclosure. Based on the embodiments of the present disclosure, any other embodiment obtained by a person skilled in the art without paying any creative effort shall fall within the protection scope of the present disclosure.

Figure 3:
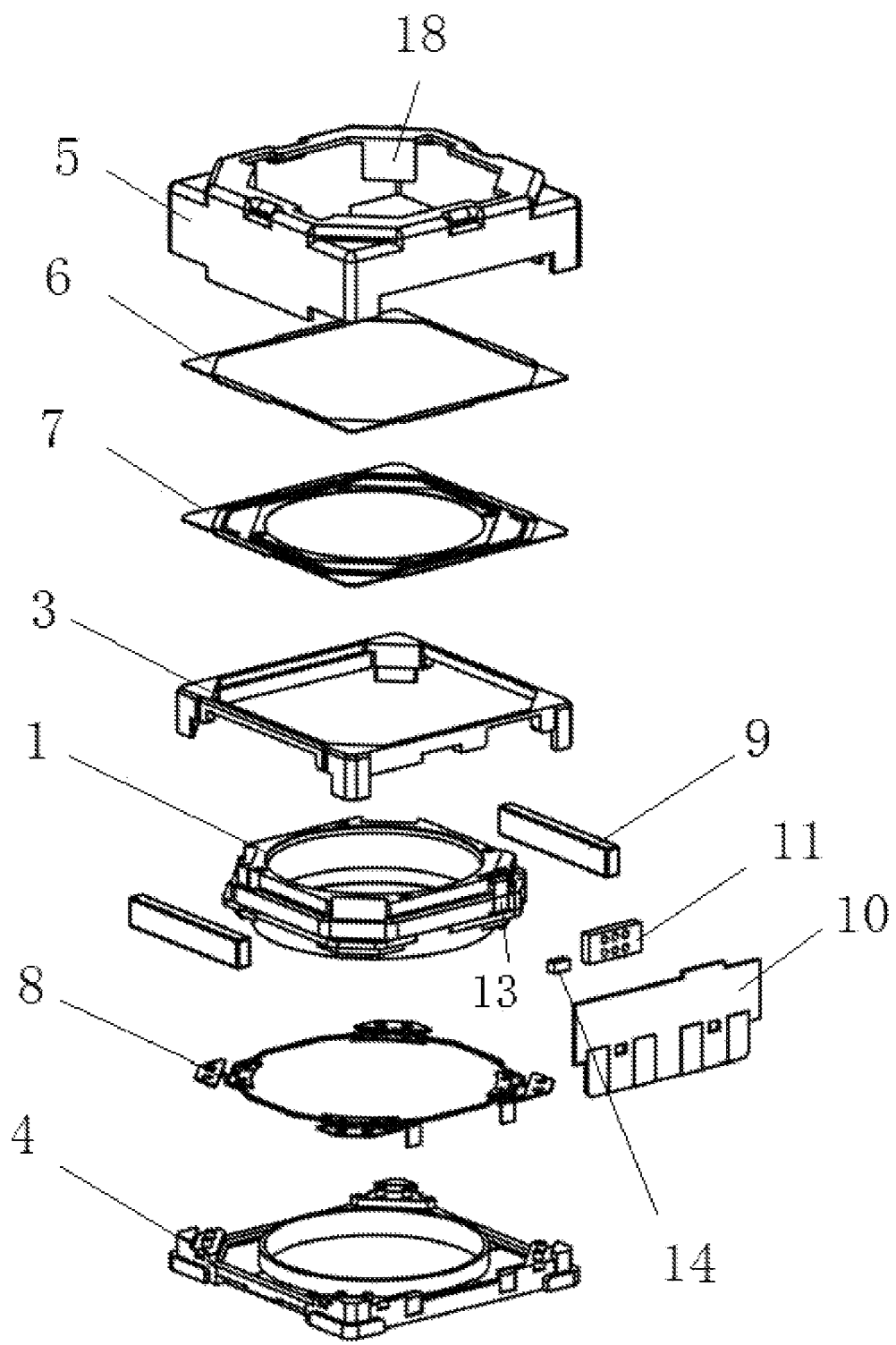
FIG. 3 is a decomposition diagram of an inner component of a closed-loop lens drive device.

As shown in FIG. 3, a lens drive device includes a lens support 1, a coil 2 winded at a periphery of the lens support 1, an upper cover 3 arranged above the lens support 1, and a lower cover 4 arranged below the lens support 1; the upper cover 3 and the lower cover 4 are nested to each other and are configured in a frame manner; a screening can 5 is covered outside the lens support; an upper gasket 6 is arranged above the upper cover 3; an upper spring 7 is clamped between the upper gasket 6 and the upper cover 3; a lower spring 8 is provided between the lens support 1 and the lower cover 4, and is configured to support the lens support; wherein driving magnets 9 are respectively provided on opposite two inner sidewalls of the screening can 5; a PCB board 10 is provided on a sidewall at another side of the screening can 5; a Hall chip 11 is provided on the PCB board 10; a Hall magnet back gasket 12 and a Hall magnet 13 are provided at corresponding positions of the lens support 1; spatially, the Hall magnet 13 and the Hall chip 11 are spaced to each other and are configured oppositely; and the PCB board 10 and the Hall chip 11 thereon and the Hall magnet 13 form a lens position detection unit.

Figure 4:
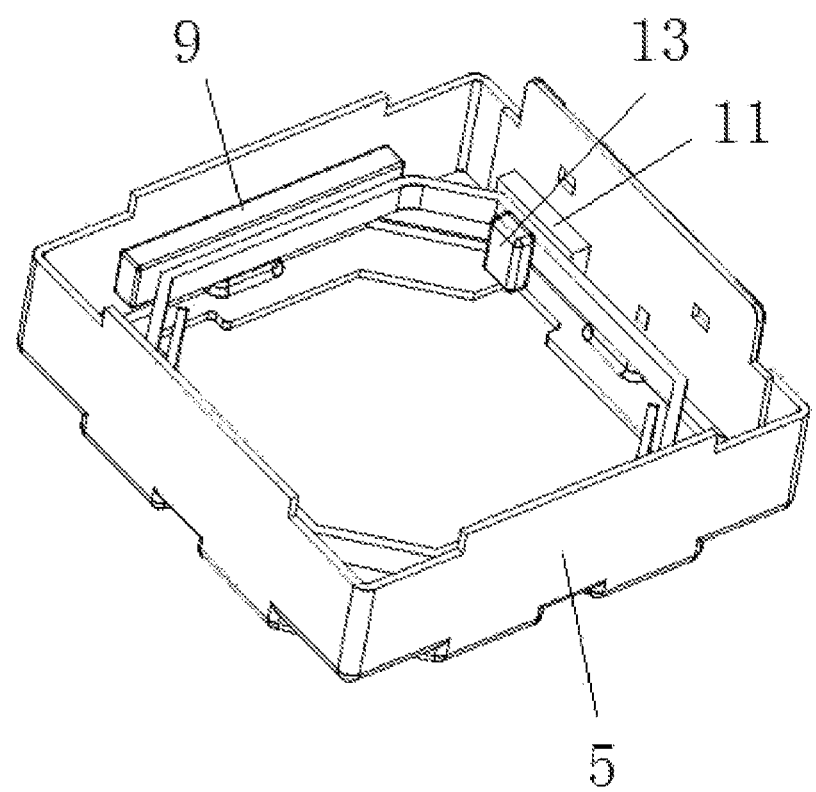
FIG. 4 is a schematic diagram of an assembly effect of a positional relationship among a screening can, a driving magnet, a Hall magnet and a Hall chip.

As shown in FIG. 4, the screening can 5 is of a quadrangular housing shape having four side edges by looking on a flat surface; two elongated driving magnets 9 are respectively provided on two side portions, opposite to each other, of the screening can 5; a PCB board component is arranged inside a relatively short sidewall, adjacent to the sides of the two driving magnets, of the screening can; a PCB board component consists of the Hall chip 11, a capacitor 14, and the PCB board 10 having four terminal pins; the Hall chip 11 and the capacitor 14 are placed at the same side of the PCB board 10; the PCB board component and the Hall magnet form a lens position detection unit; spatially, the Hall magnet 13 and the Hall chip 11 are spaced to each other and are configured oppositely; the four terminal pins 15 are provided at the bottom of the PCB board 10; the four terminal pins 15 face to an inner circumference sidewall of the screening can, wherein positive and negative ends of a lower spring terminal are connected inside two pins; and an input-output function for power information of the closed-loop lens drive device is implemented by the four terminal pins.

The screening can is made of a non-magnetic soft stainless steel material and has the effects of preventing static electricity and screening caning electromagnetically when being grounded in an external connection process. After the screening can is added, the interference to collect a signal of a high-frequency module may be greatly reduced when a motor coil works and a call quality is enhanced. After the screening can of a motor is grounded, the static electricity produced by a signal and produced by other frictions may be prevented from being damaging the motor.

The upper gasket is provided between the screening can and the upper spring. The upper gasket is of a square platy structure, is made of the same material with the spring and has the same hardness with the spring. Its flatness is smooth and is not oblique after an assembled lens is driven on a shaft diameter.

The lens support is of a tubular shape on an optical axis diameter, and is clamped and fixed by the upper spring and lower spring. An inner circumferential side of the lens support is provided with the lens, and an outer circumferential side of the lens support is provided with the coil. The outer circumferential side of the lens support is consistent with the inner circumferential shape of the coil.

Figure 9:
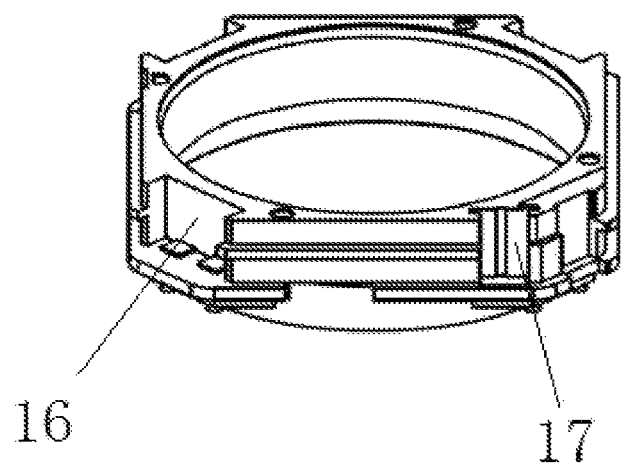
FIG. 9 is a status before a Hall gasket and a Hall magnet are put into a lens support.
Figure 10:
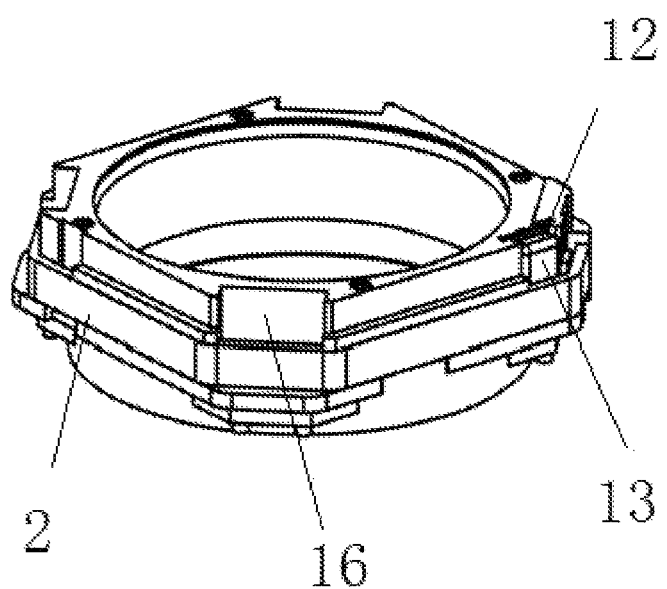
FIG. 10 is a status after a Hall gasket and a Hall magnet are, put into a lens support.

As shown in FIG. 9, four gap portions 16 are respectively provided at upper four corners of an outer circumference of the lens support. The four gap portions are matched with four turnups 18 inside the screening can, so as to prevent the lens support when being driven from inclining and shaking on X and Y axles of a circumferential direction or on a Z-axis direction of an optical axis. As shown in FIG. 9, an opened notch portion 17 is additionally provided at an upper corner of the lens support. The opened notch portion 17 is accommodated into the Hall magnet back gasket 12 and the Hall magnet 13 sequentially and vertically from inside to outside. The Hall magnet back gasket 12 is made of a stainless steel high-magnetism material, so that the magnetic flux intensity of the Hall magnet 13 can be effectively protected and improved, and meanwhile, the Hall magnet can be assembled more flatly.

As shown by an assembled status in FIG. 4, the Hall chip and the Hall magnet are spaced at a certain space and are arranged oppositely. A lens position detection unit for detecting a position of the lens support is implemented by the PCB board component and the Hall magnet. Through the Hall effect of the Hall chip, a Gaussian value in a magnetic field is measured, thereby measuring the position of the lens support.

Figure 5:
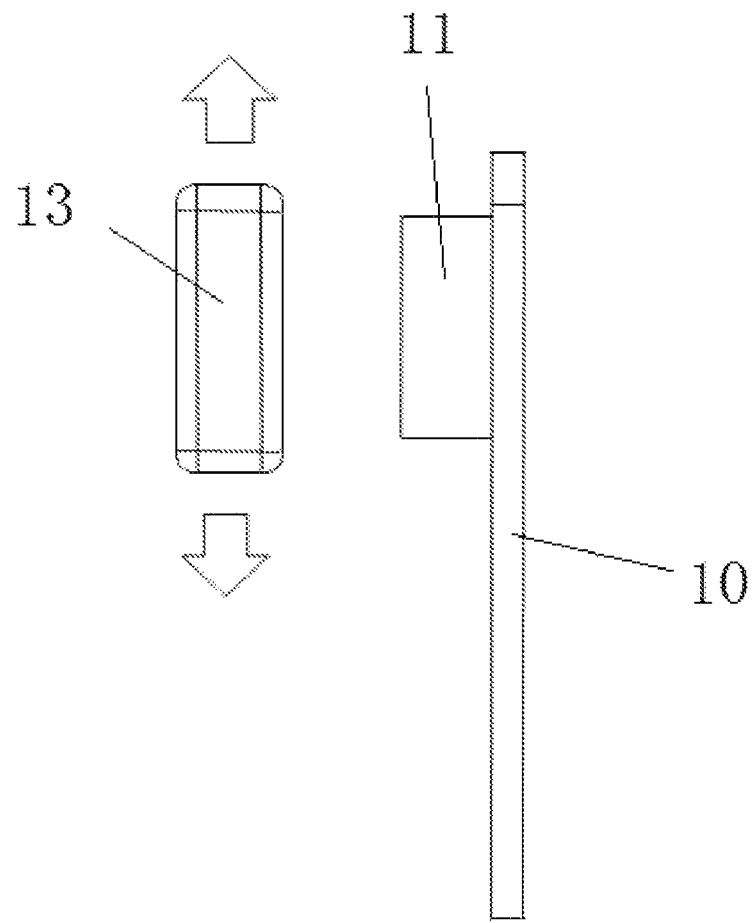
FIG. 5 is a schematic diagram of a positional relationship and an action direction of a Hall magnet and a Hall chip.
Figure 6:
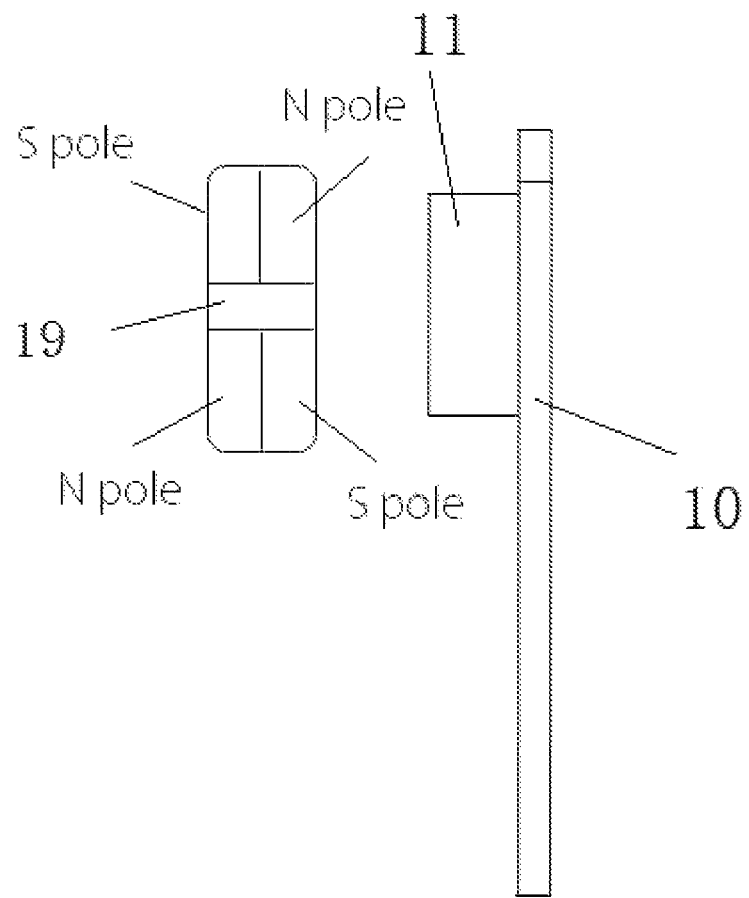
FIG. 6 is a schematic diagram of four-pole magnetization of a Hall magnet.
Figure 7:
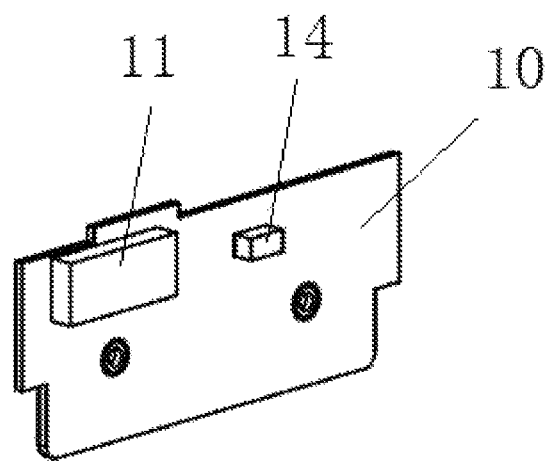
FIG. 7 is a structural schematic diagram of a PCB board component.
Figure 8:
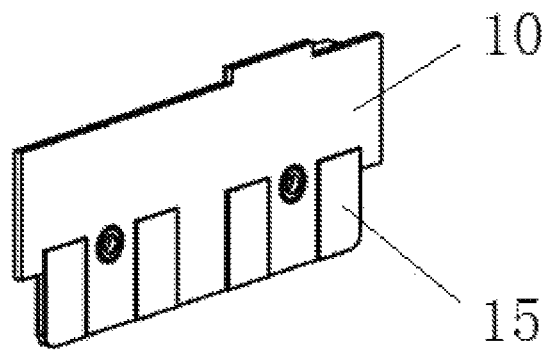
FIG. 8 is a back of FIG. 7.

FIG. 5 is a schematic diagram of a positional relationship and an action direction of a Hall magnet and a Hall chip. FIG. 6 is a preferred embodiment of the present disclosure. Four-pole magnetization is adopted by the Hall magnet. As shown in FIG. 6, through a manner of four-pole magnetization, an upper end of the Hall magnet is formed into a magnetic area with an S pole outside and an N pole inside, and a lower end of the Hall magnet is formed into a magnetic area with an S pole inside and an N pole outside; and a non-magnetic area 19 between the upper end and the lower end is not greater than 0.2 mm, so that the induction intensity of a magnetic field is intensified.

A closed-loop focusing technology is adopted by the closed-loop focusing drive device of an embodiment of the present disclosure. A manner for controlling the position of the lens is based on a principle of Hall effect of a Hall sensor in the Hall chip. The specific action principle is as follows: after sensing a Gaussian value of the lens at an initial position (an unstart status) via the Hall sensor, sensing a Gaussian value at a maximum start position, storing a measured Gaussian value to the Hall chip, and converting a Hall sensed simulation value into a digital signal. Different Gaussian values, detected at different positions, of the Hall magnet are respectively endowed with different code information, and thus the lens is moved. The Hall chip converts sensed magnetic flux density into high and low signals, and writes mobile information at an ideal position of the lens by virtue of a sensed position.

In other words, the Hall chip is employed to sense the intensities of the magnetic fields mentioned above at 0 and max positions of the lens and the intensities are stored to an $E^2ROM$ effective physical position drive of the Hall chip. During lens movement, we can continuously measure the intensity of a magnetic field to a mobile position. Under a condition in which a space between equivalent Hall magnet and chip is unchanged, during a process when a carrier is moved up and down, the intensity of the magnetic field at a same position in Hall sensed upper and lower displacements keeps unchanged substantially. By feeding the intensity back to the Hall chip, the chip obtains positive and negative errors according to a feedback value, and then controls movement direction and speed of the lens using the positive and negative errors, implementing accurate and quick focusing within a very short time.

The lens position detection unit is introduced by the closed-loop lens drive device, which is equivalent to that there is one more feedback control means; and thus, the displacement of the lens in the lens support at each time is more accurate, and the times that the lens is moved back and forth is reduced; that is, the focusing speed is improved.

In the closed-loop lens drive device of some embodiments of the present disclosure, the configured position detection mechanism detects the position of the lens using the Hall effect.

The four-pole magnetization is adopted by the Hall magnet. In such a manner, the non-magnetic area of the magnet is very small and is only 0.2 mm, so the induction intensity of the magnetic field is enhanced. After the Hall magnet and Hall element sensor are employed, the quick focusing is implemented, and a condition in which the lens is shaken back and forth nearly a focusing position is reduced. After the Hall element sensor is powered on and the magnetic field, is applied externally, a Hall effect having a power (a Hall output voltage) is produced on a direction perpendicular to the magnetic field. According to a corresponding magnetic field at a position where the magnetic field is produced and the Hall magnet is located, a Hall output voltage value of the Hall element sensor is detected via the detection device; and furthermore, according to a calculation device, the position of the lens support is calculated out.

The closed-loop lens drive device of some embodiments of the present disclosure has focusing accuracy and has the characteristics of faster focusing and lower power consumption, etc.; the imaging effect is relatively good in cooperation with the lens; and even under a condition of insufficient light, the imaging effect is more excellent.

In closed-loop control of some embodiments of the present disclosure, since a control subject can find and correct an operation deviation of a controlled object according to feedback information, so relatively strong anti-interference capacity is achieved, the effective control can be performed, and thus the realization of a predetermined goal is guaranteed.

Through the closed-loop lens drive device of some embodiments of the present disclosure, the establishment time can be shortened relatively, and the problems of a delay phenomenon and a poor solving posture during motor operation are reduced.

In an embodiment of the present disclosure, the two elongated driving magnets are respectively provided on two opposite sides in the screening can, and the Hall magnet is provided at the opened notch portion of the lens support. A mutual space interval between the driving magnets and the Hall magnet is relatively large, so mutual interference between magnetic fields is avoided; as the respective assembly prevention is compact, a magnetic field mutual interference condition such as a mutual attractive or repulsive force and the like possibly generated between the driving magnets and the Hall magnet is avoided in a structure. Since the driving magnets are prevented from generating negative effect and impact on the Hall magnet and the Hall chip in a spatial structure, no obstacle is generated for stable signal output and action of a sensor. In other words, no impact is caused to calculate a correct position of the lens.

According to a closed-loop structure of some embodiments of the present disclosure, since the driving magnets and the Hall magnet are not hindered to each other in a configuration structure, no obstacle is produced to assembly work, and the further miniaturization and thinning of the lens drive device also become possible.

The above are further detailed descriptions of the present disclosure with reference to the specific preferred embodiments and cannot be understood that the specific implementations of the present disclosure are only limited to these descriptions. A person of ordinary skill in the art further may make a plurality of simple, deviations or replacements on the premise of not departing from a concept of the present disclosure and all should be considered as a scope of protection of the present disclosure.

What is claimed is:

1. A lens drive device, comprising:
a lens support,
a coil winded, the coil winded at a periphery of the lens support,
an upper cover, the upper cover arranged above the lens support, and
a lower cover, the lower cover arranged below the lens support,
a screening can, the screening can is covered outside the lens support; wherein just two elongated driving magnets are respectively provided on opposite two inner sidewalls of the screening can; a Printed Circuit Board (PCB) is provided on a sidewall at another side of the screening can; a Hall chip is provided on the PCB; a Hall magnet back gasket and a Hall magnet are provided at corresponding positions of the lens support; spatially, the Hall magnet and the Hall chip are spaced to each other and are configured oppositely; and the PCB, the Hall chip on the PCB and the Hall magnet form a lens position detection unit, the lens support comprises four straight edges and four corner edges, the two elongated driving magnets are respectively provided on two different inner circumferential sidewalls of the screening can and two straight edges of the four straight edges of the lens support; and the two elongated driving magnets are opposite to each other, an opened notch portion is provided at a side of another straight edge of the four straight edges of an outer circumference of the lens support; and the opened notch portion is accommodated into the Hall magnet back gasket and the Hall magnet sequentially from inside to outside, the Hall magnet back gasket is made of a stainless steel high-magnetism sheet of material, so that magnetic flux intensity of the Hall magnet is effectively protected and improved, and the Hall magnet is assembled more flatly; the Hall magnet is a four-pole magnet with a non-magnetic area that is not greater than 0.2 mm.

2. The lens drive device as claimed in claim 1, wherein an upper gasket is arranged above the upper cover; an upper spring is clamped between the upper gasket and the upper cover; and a lower spring is provided between the lens support and the lower cover, and is configured to support the lens support.

* * * * *